United States Patent
Choi

(10) Patent No.: US 6,825,893 B2
(45) Date of Patent: Nov. 30, 2004

(54) ARRAY SUBSTRATE FOR LIQUID CRYSTAL DISPLAY DEVICE HAVING A CONTACT HOLE SITUATED ON ACTIVE LAYER AND MANUFACTURING METHOD THEREOF

(75) Inventor: Byeong-Dae Choi, Daegu (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/408,126

(22) Filed: Apr. 8, 2003

(65) Prior Publication Data

US 2003/0189678 A1 Oct. 9, 2003

(30) Foreign Application Priority Data

Apr. 8, 2002 (KR) ......................................... 2002-18961

(51) Int. Cl.$^7$ ...................... G02F 1/136; G02F 1/1333; H01L 29/04
(52) U.S. Cl. ............................ 349/43; 349/42; 349/138; 257/59; 257/72
(58) Field of Search ............................ 349/42, 43, 138; 257/59, 72

(56) References Cited

U.S. PATENT DOCUMENTS

| | | | |
|---|---|---|---|
| 6,207,970 B1 * | 3/2001 | Kim | 257/59 |
| 6,337,284 B1 * | 1/2002 | Hwang et al. | 438/710 |
| 6,570,182 B2 * | 5/2003 | Jeong et al. | 257/59 |
| 6,580,473 B2 * | 6/2003 | Kim | 349/38 |
| 6,667,778 B1 * | 12/2003 | Ono et al. | 349/43 |
| 2001/0022633 A1 * | 9/2001 | Kwak et al. | 349/43 |
| 2002/0054247 A1 * | 5/2002 | Hwang et al. | 349/43 |

* cited by examiner

Primary Examiner—Tarifur R. Chowdhury
(74) Attorney, Agent, or Firm—Morgan Lewis & Bockius LLP

(57) ABSTRACT

An array substrate for a liquid crystal display device includes a substrate, a gate line and a data line on the substrate, the gate line and the data line crossing each other to define a pixel area, a thin film transistor electrically connected to the gate and data line and includes a gate electrode, an active layer, a source electrode, and a drain electrode, a passivation layer covering the gate line, the data line, and the thin film transistor, and having a contact hole situated on the active layer to expose portions of the drain electrode and the active layer, and a pixel electrode on the passivation layer and connected to the drain electrode through the contact hole.

8 Claims, 19 Drawing Sheets

ARRAY SUBSTRATE FOR LIQUID CRYSTAL DISPLAY DEVICE HAVING A CONTACT HOLE SITUATED ON ACTIVE LAYER AND MANUFACTURING METHOD THEREOF

The present invention claims the benefit of Korean Patent Application No. 2002-18961, filed in Korea on Apr. 8, 2002, which is hereby incorporated by reference.

BACKGROUND OF THE INVENTION

1. Field of the Invention

The present invention relates to a liquid crystal display (LCD) device and more particularly, to an array substrate for a liquid crystal display device and a manufacturing method thereof.

2. Discussion of the Related Art

In general, a liquid crystal display (LCD) device includes two substrates that are spaced apart and face each other, and a liquid crystal material layer interposed between the two substrates. Each of the substrates includes electrodes that face each other, wherein a voltage applied to each electrode induces an electric field between the electrodes. An alignment of liquid crystal molecules of the liquid crystal material layer is changed by varying an intensity or direction of the applied electric field. Accordingly, the LCD device displays an image by varying light transmissivity through the liquid crystal material layer in accordance with the arrangement of the liquid crystal molecules.

FIG. 1 is an exploded perspective view of a liquid crystal display (LCD) device according to the related art. In FIG. 1, an LCD device 11 has upper and lower substrates 5 and 22, which are spaced apart from and facing each other, and a liquid crystal material layer 15 interposed between the upper and lower substrates 5 and 22.

The upper substrate 5 includes a black matrix 6, a color filter layer 7, and a transparent common electrode 9 subsequently disposed on an interior surface thereof. The black matrix 6 has an opening such that the color filter layer 7 corresponds to the opening of the black matrix 6 and includes three sub-color filters of red (R), green (G), and blue (B).

A gate line 12 and a data line 38 are formed on an interior surface of the lower substrate 22, whereby the gate line 12 and the date line 38 cross each other to define a pixel area P, and a thin film transistor T is formed at the crossing of the gate line 12 and the data line 38. The thin film transistor T is composed of a gate electrode, a source electrode, and a drain electrode. A pixel electrode 52, which is connected to the thin film transistor T, is formed within the pixel area P and corresponds to the sub-color filters. In addition, the pixel electrode 52 is made of a light transparent conductive material, such as indium-tin-oxide (ITO). The lower substrate 22 may be commonly referred to as an array substrate.

A scanning pulse is supplied to the gate electrode of the thin film transistor T through the gate line 12, and a data signal is supplied to the source electrode of the thin film transistor T. The LCD device is driven due to electrical and optical effects of the liquid crystal material layer 15. The liquid crystal material layer 15 includes a dielectric anisotropic material having spontaneous polarization properties. Accordingly, when an electric field is induced to the liquid crystal material layer 15, the liquid crystal molecules form a dipole due to the spontaneous polarization. Thus, the liquid crystal molecules of the liquid crystal material layer 15 are arranged by the applies electric field. Optical modulation of the liquid crystal material layer 15 occurs according to the arrangement of the liquid crystal molecules. Therefore, images of the LCD device are produced by controlling light transmittance of the liquid crystal material layer 15 due to optical modulation.

FIG. 2 is a plan view of an array substrate for a LCD device according to the related art. In FIG. 2, a gate line 12 and a data line 38 cross each other to define a pixel area P, and a thin film transistor T is formed at the crossing of the gate and data lines 12 and 38 to function as a switching element. The thin film transistor T is composed of a gate electrode 14 that is connected to the gate line 12 and receives scanning signals, a source electrode 40 that is connected to the data line 38 and receives data signals, and a drain electrode 42 that is spaced apart from the source electrode 40. The thin film transistor T further includes an active layer 32 between the gate electrode 14 and the source and drain electrodes 40 and 42.

A storage capacitor electrode 28 overlaps the gate line 12. A pixel electrode 52 is formed in the pixel area P and is connected to the drain electrode 42 through a drain contact hole 48 and to the storage capacitor electrode 28. The gate line 12 and the storage capacitor electrode 28 function as first and second storage capacitor electrodes, respectively, and form a storage capacitor Cst.

Although not shown in FIG. 2, an ohmic contact layer is formed between the active layer 32 and the source and drain electrodes 40 and 42. The active layer 32 is made of amorphous silicon and the ohmic contact layer is formed of a doped amorphous silicon. A first pattern 35 and a second pattern 29, which include the amorphous silicon and the doped amorphous silicon, are formed under the data line 38 and the storage capacitor electrode 28, respectively. The array substrate of FIG. 2 is fabricated using four masks, and in the array substrate, the pixel electrode may be disconnected in a region contacting the drain electrode. Thus, poor images may be displayed.

FIGS. 3A to 3C, 4A to 4C, 5A and 5B, and 6A and 6B show a manufacturing method of an array substrate using four masks according to the related art, and correspond to a region D of FIG. 2. FIGS. 3A, 4A, 5A, and 6A are plan views showing the manufacturing method of the array substrate according to the related art, and FIGS. 3B and 3C are cross sectional views along III—III of FIG. 3A, FIGS. 4B and 4C are cross sectional views along IV—IV of FIG. 4A, and FIG. 5B is a cross sectional view along V—V of FIG. 5A, and FIG. 6B is a cross-sectional view along VI—VI of FIG. 6A.

In FIGS. 3A and 3B, a gate line 12 and a gate electrode 14 are formed on a transparent insulating substrate 22 by depositing a first metal layer and patterning the first metal layer through a first mask process. The gate line 12 and the gate electrode 14 are made of a metal material, such as aluminum (Al), an aluminum alloy, molybdenum (Mo), tungsten (W), and chromium (Cr). The gate line 12 and the gate electrode 14 may be formed of a double layer using aluminum or an aluminum alloy and molybdenum or chromium.

Next, a gate insulating layer 16, an amorphous silicon layer 18, a doped amorphous silicon layer 20, and a second metal layer 24 are subsequently deposited on the substrate 22, the gate line 12, and the gate electrode 14. The gate insulating layer 16 is made of an inorganic insulating material, such as silicon nitride ($SiN_x$) and silicon oxide ($SiO_2$), and the second metal material 24 is formed of one of chromium, molybdenum, tungsten, and tantalum (Ta).

In FIG. 3C, a photoresist layer 26 is formed on the second metal layer 24 by coating a photoresist material. A mask 50 includes a transmitting portion A, a blocking portion B, and a half transmitting portion C that are disposed over the photoresist layer 26, wherein the half transmitting portion C corresponds to the gate electrode 14. The photoresist layer 26 may be a positive type, wherein a portion exposed to light is developed and removed. Subsequently, the photoresist layer 26 is exposed to light such that the portion of the photoresist layer 26 corresponding to the half transmitting portion C is exposed to the light in an amount less than the photoresist layer 26 corresponding to the transmitting portion A.

In FIGS. 4A and 4B, the exposed photoresist layer 26 (in FIG. 3C) is developed, whereby a photoresist pattern 26a having different thicknesses is formed. A first thickness of the photoresist pattern 26a corresponds to the blocking portion B (in FIG. 3C) and a second thickness of the photoresist pattern 26a, which is thinner than the first thickness, corresponds to the half transmitting portion C (in FIG. 3C). The second metal layer 24, the doped amorphous silicon layer 20, and the amorphous silicon layer 18 (of FIG. 3C) that have been exposed by the photoresist pattern 26a are removed. Thus, a source and drain pattern 28, a data line 38, a doped amorphous silicon pattern 30a, and an active layer 32 are formed. The second metal layer 24 (in FIG. 3C) is etched by a dry etching method, and the doped amorphous silicon layer 20 and the amorphous silicon layer 18 of FIG. 3C are patterned by a wet etching method. The source and drain pattern 28 is formed over the gate electrode 14, and is connected to a data line 38 that extends along a vertical direction. The doped amorphous silicon pattern 30a and the active layer 32 have the same shape as the source and drain pattern 28 and the data line 38.

Next, the first thickness of the photoresist pattern 26a is removed through an ashing process, whereby exposing portions of the source and drain pattern 28. At this time, the photoresist pattern 26a of the second thickness is partially removed and the thickness of the photoresist pattern 26a is reduced. Additionally, edges of the photoresist pattern 26a are removed.

In FIG. 4C, the source and drain pattern 28 and the doped amorphous silicon pattern 30a (in FIG. 4B) exposed by the photoresist pattern 26a are etched, thereby forming source and drain electrodes 40 and 42 and an ohmic contact layer 30. The source and drain electrodes 40 and 42 are spaced apart from each other, and a region between the source and drain electrodes 40 and 42 corresponds to the half transmitting portion C (in FIG. 3C). Accordingly, the source and drain electrodes 40 and 42, the data line 38, the ohmic contact layer 30, and the active layer 32 are formed through a second mask process using the mask 50 (in FIG. 3C).

In FIGS. 5A and 5B, a passivation layer 46 is formed on the data line 38 and the source and drain electrodes 40 and 42 by coating a transparent organic material, such as benzocyclobutene (BCB) and an acrylic resin, or by depositing an inorganic material, such as silicon nitride (SiNx) and silicon oxide ($SiO_2$). Next, the passivation layer 46 is patterned through a third mask process, and a drain contact hole 48 that exposes a portion of the drain electrode 42 is formed through the gate insulating layer 16. During the third mask process, the gate insulating layer 16 is also etched, and the drain contact hole 48 exposes a sidewall of the drain electrode 42 and the substrate 22. Here, the gate insulating layer 16 is under-etched, and a step E is formed in the drain contact hole 48.

In FIG. 5A, the source electrode 40 has a "U" shape and surrounds the drain electrode 42. Accordingly, since a channel length between the source and drain electrodes 40 and 42 decreases and a channel width increases due to the "U" shape, carrier mobility of a thin film transistor increases.

In FIGS. 6A and 6B, a pixel electrode 52 is formed on the passivation layer 46 by depositing a transparent conductive material, such as indium-tin-oxide (ITO) and indium-zinc-oxide (IZO), and patterning the transparent conductive material through a fourth mask process. The pixel electrode 52 is connected to the drain electrode 42 via the drain contact hole 48. However, the pixel electrode 52 is disconnected due to the step E.

SUMMARY OF THE INVENTION

Accordingly, the present invention is directed to an array substrate for a liquid crystal display device and a manufacturing method thereof that substantially obviates one or more of problems due to limitations and disadvantages of the related art.

An advantage of the present invention is to provide an array substrate for a liquid crystal display device and a manufacturing method thereof that prevents signal disconnection.

Another object of the present invention is to provide an array substrate for a liquid crystal display device and a manufacturing method thereof that improves displayed image quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate, a gate line and a data line on the substrate, the gate line and the data line crossing each other to define a pixel area, a thin film transistor electrically connected to the gate and data line and includes a gate electrode, an active layer, a source electrode, and a drain electrode, a passivation layer covering the gate line, the data line, and the thin film transistor, and having a contact hole situated on the active layer to expose portions of the drain electrode and the active layer, and a pixel electrode on the passivation layer and connected to the drain electrode through the contact hole.

In another aspect, a manufacturing method of an array substrate for a liquid crystal display device includes forming a gate line and a gate electrode on a substrate through a first mask process, forming a gate insulating layer, an amorphous silicon layer, a doped amorphous silicon layer, and a metal layer on the gate line and the gate electrode, forming a photoresist layer on the metal layer, forming a photoresist pattern by exposing and developing the photoresist layer through a second mask process, the photoresist layer having a first thickness and a second thickness thinner than the first thickness, patterning the metal layer, the doped amorphous silicon layer, and the amorphous silicon layer exposed by the photoresist pattern to form a source and drain pattern, a data line, a doped amorphous silicon pattern, and an active layer, removing the second thickness of the photoresist pattern through an ashing process to expose the source and drain pattern, patterning the source and drain pattern and the doped amorphous silicon pattern exposed by the photoresist pattern to form a source electrode, a drain electrode, and an ohmic contact layer, forming a passivation layer on the source and drain electrodes, patterning the passivation layer through a third mask process to form a contact hole situated on the active layer and exposing the drain electrode and the active layer, and forming a pixel electrode on the passivation layer through a fourth mask process, the pixel electrode connected to the drain electrode through the contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 1:
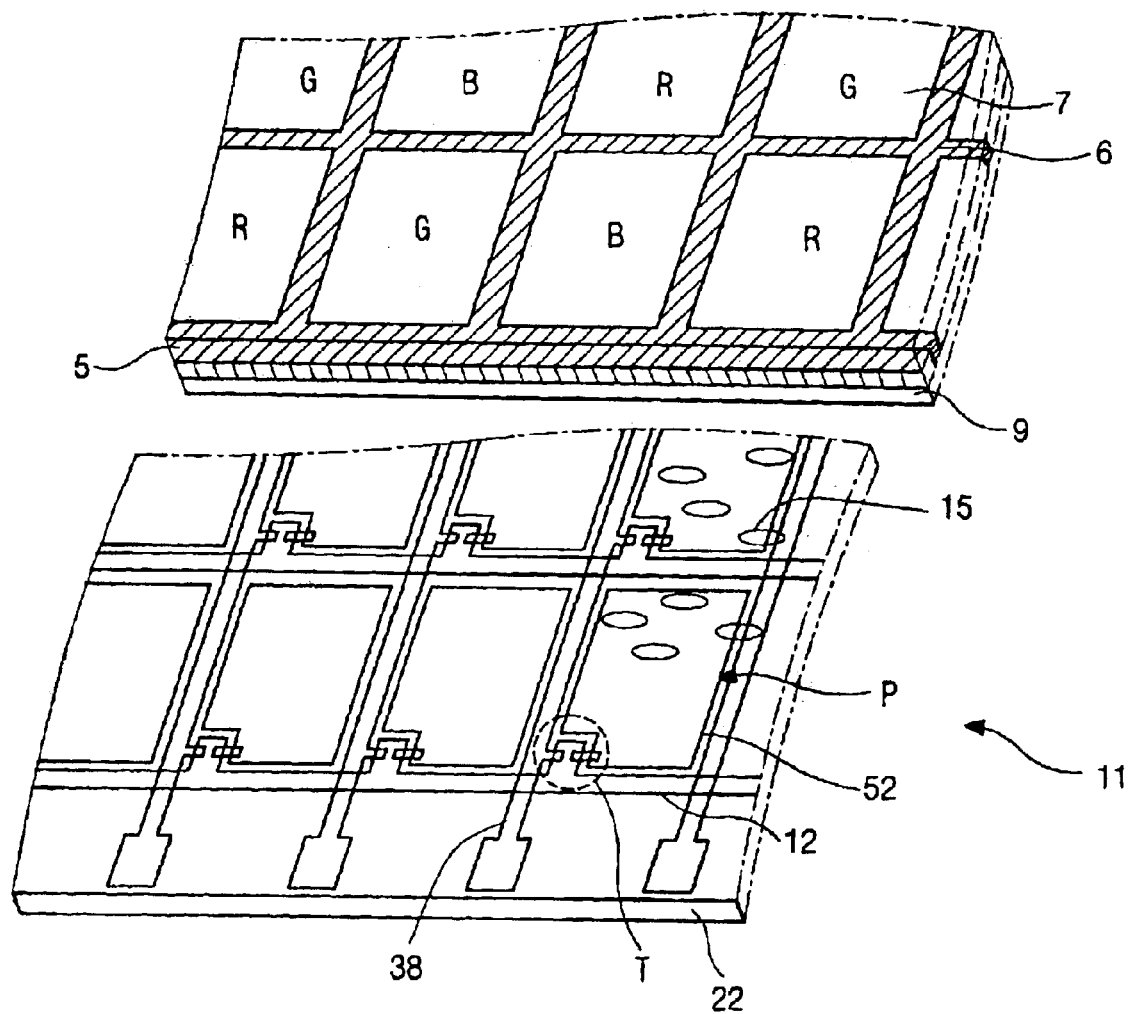
FIG. 1 is an exploded perspective view of a liquid crystal display (LCD) device according to the related art.
Figure 2:
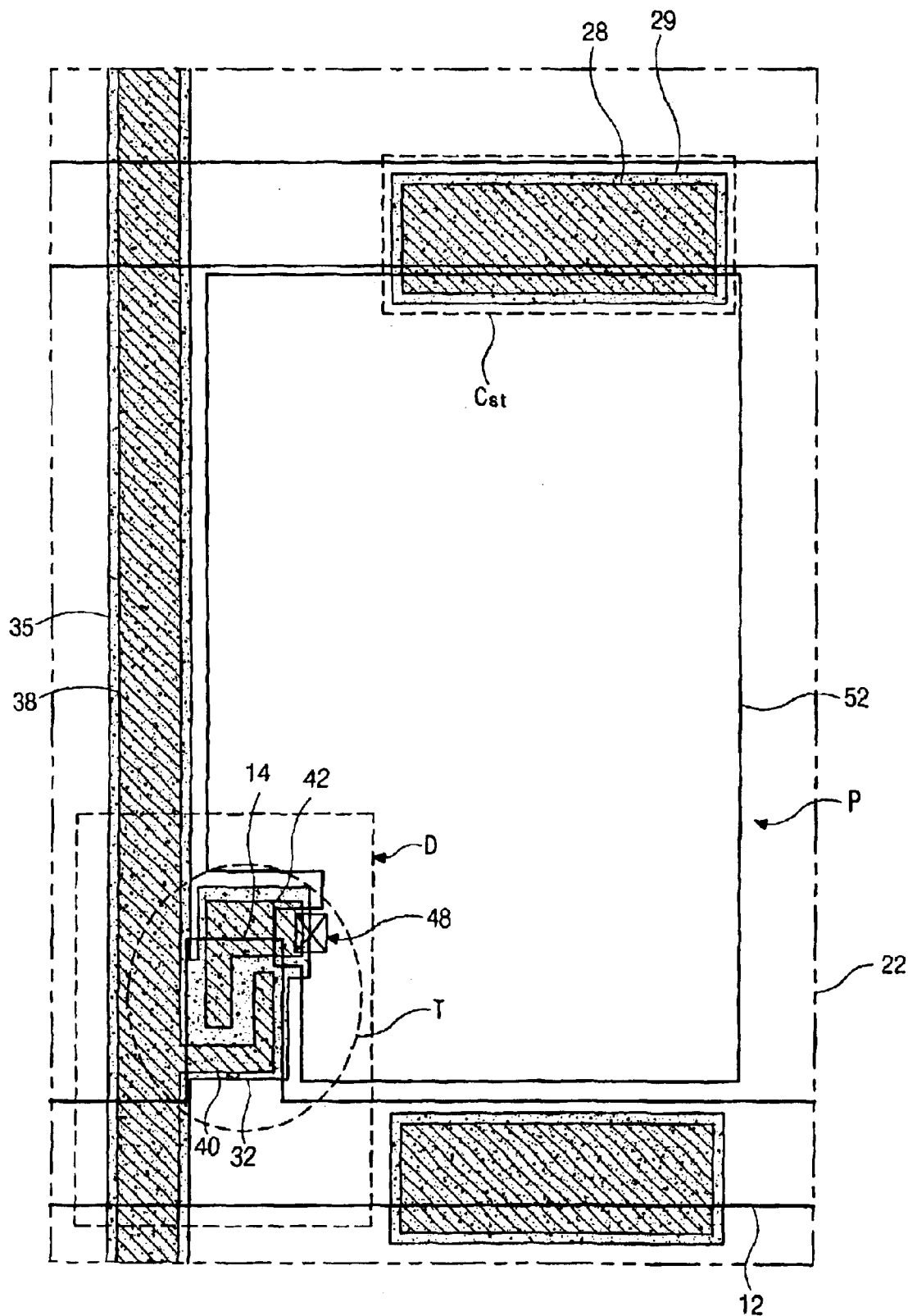
FIG. 2 is a plan view of an array substrate for a LCD device according to the related art.
Figure 3A:
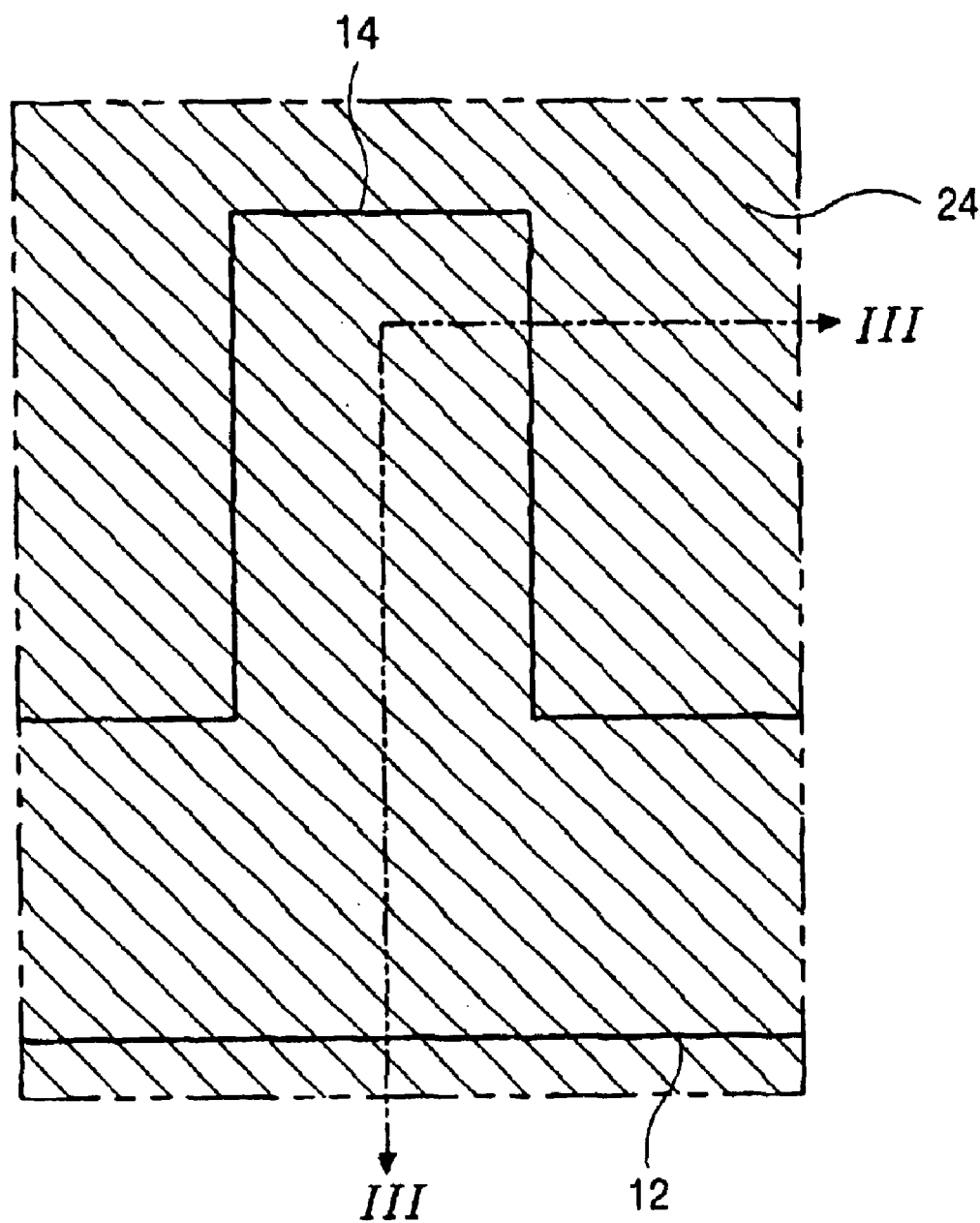
FIGS. 3A to 3C show a manufacturing method of an array substrate using four masks according to the related art.
Figure 3B:
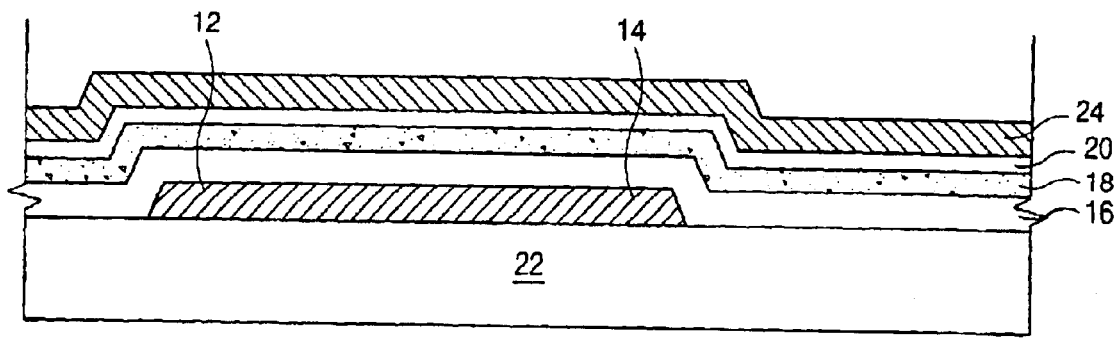
Figure 3C:
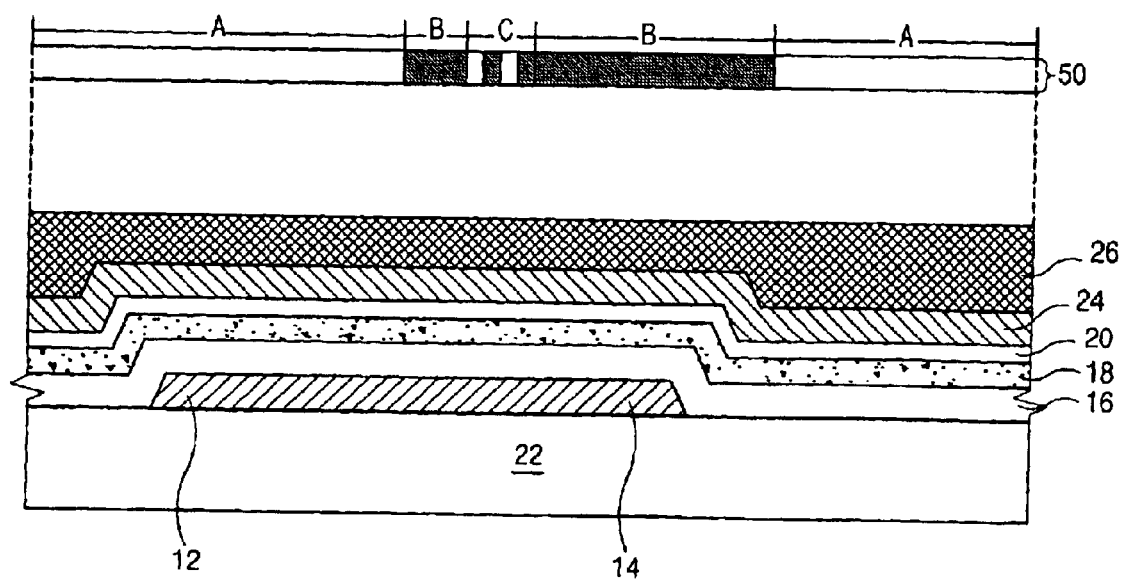
Figure 4A:
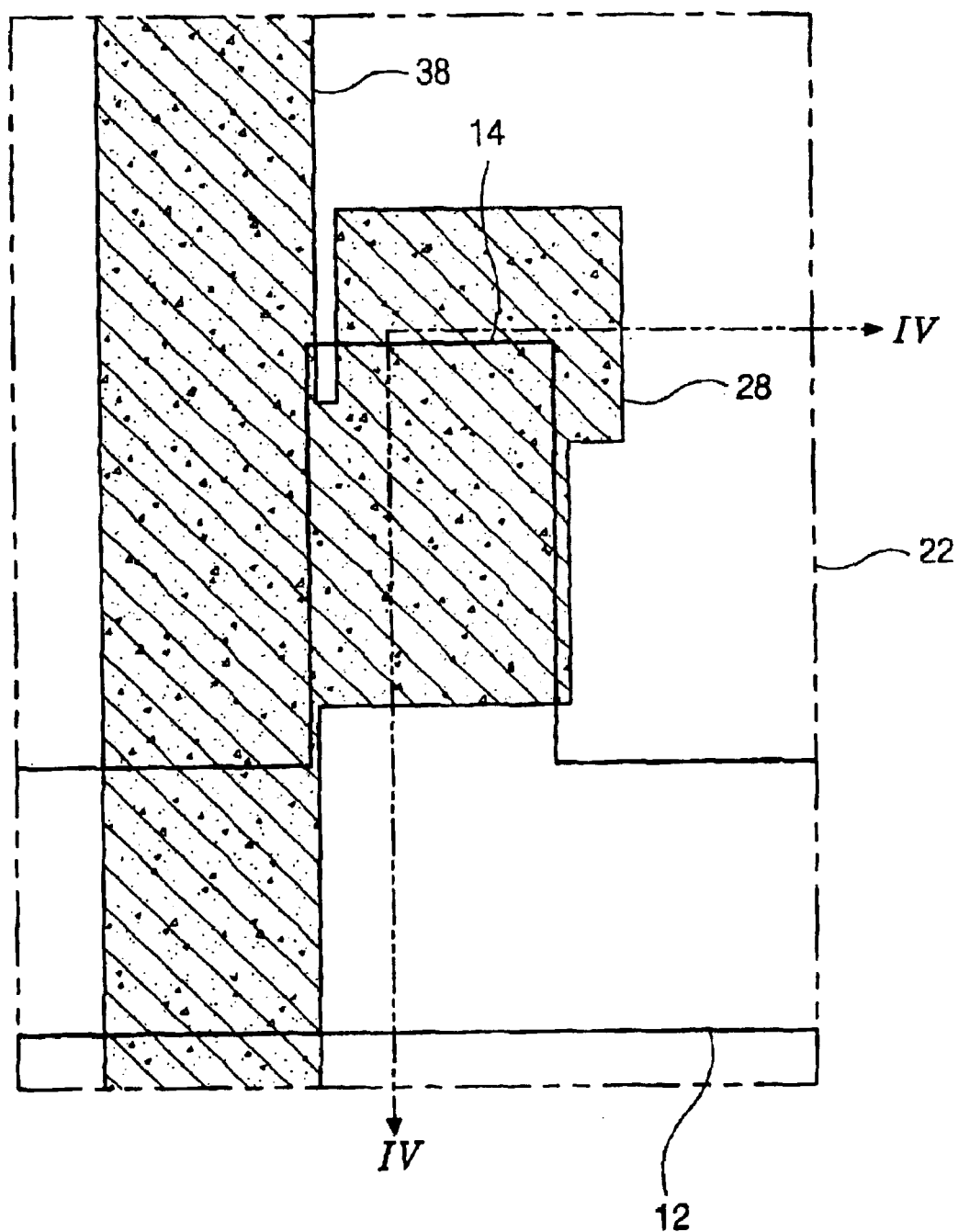
FIGS. 4A to 4C show a manufacturing method of an array substrate using four masks according to the related art.
Figure 4B:
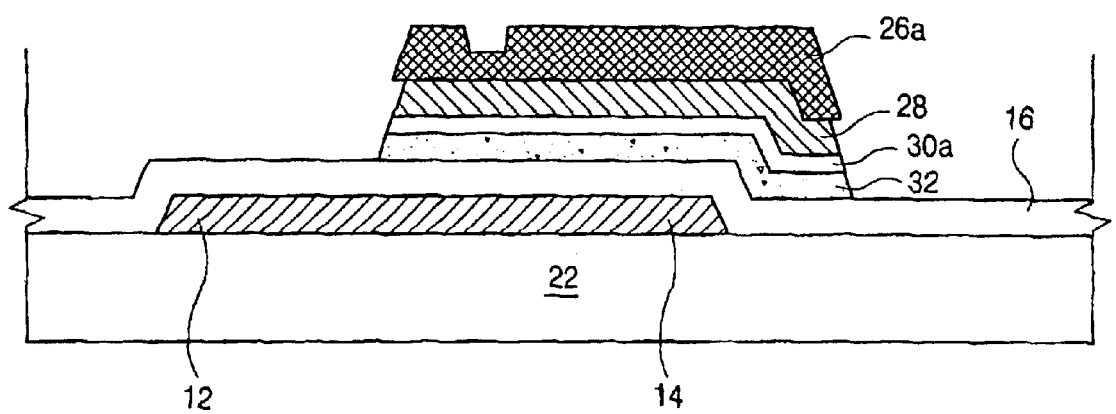
Figure 4C:
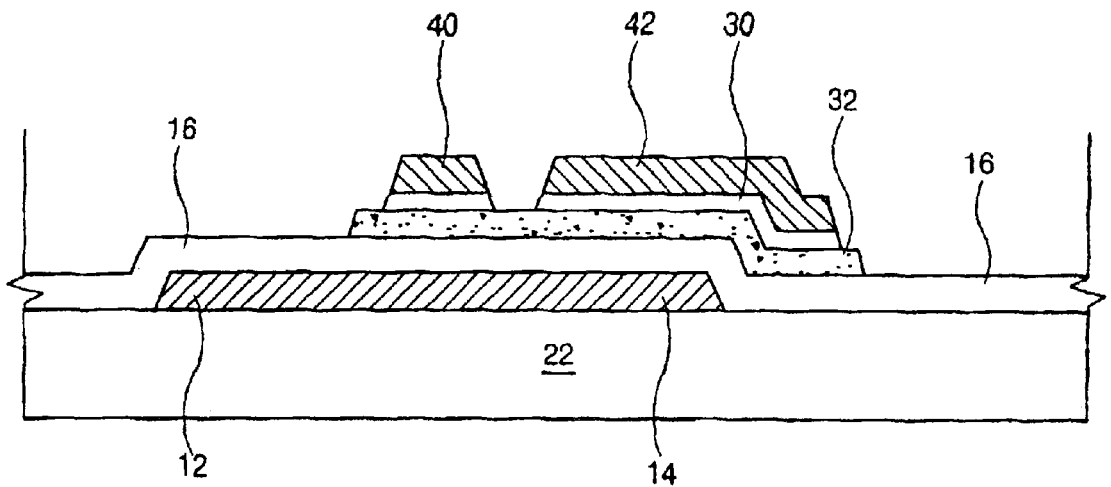
Figure 5A:
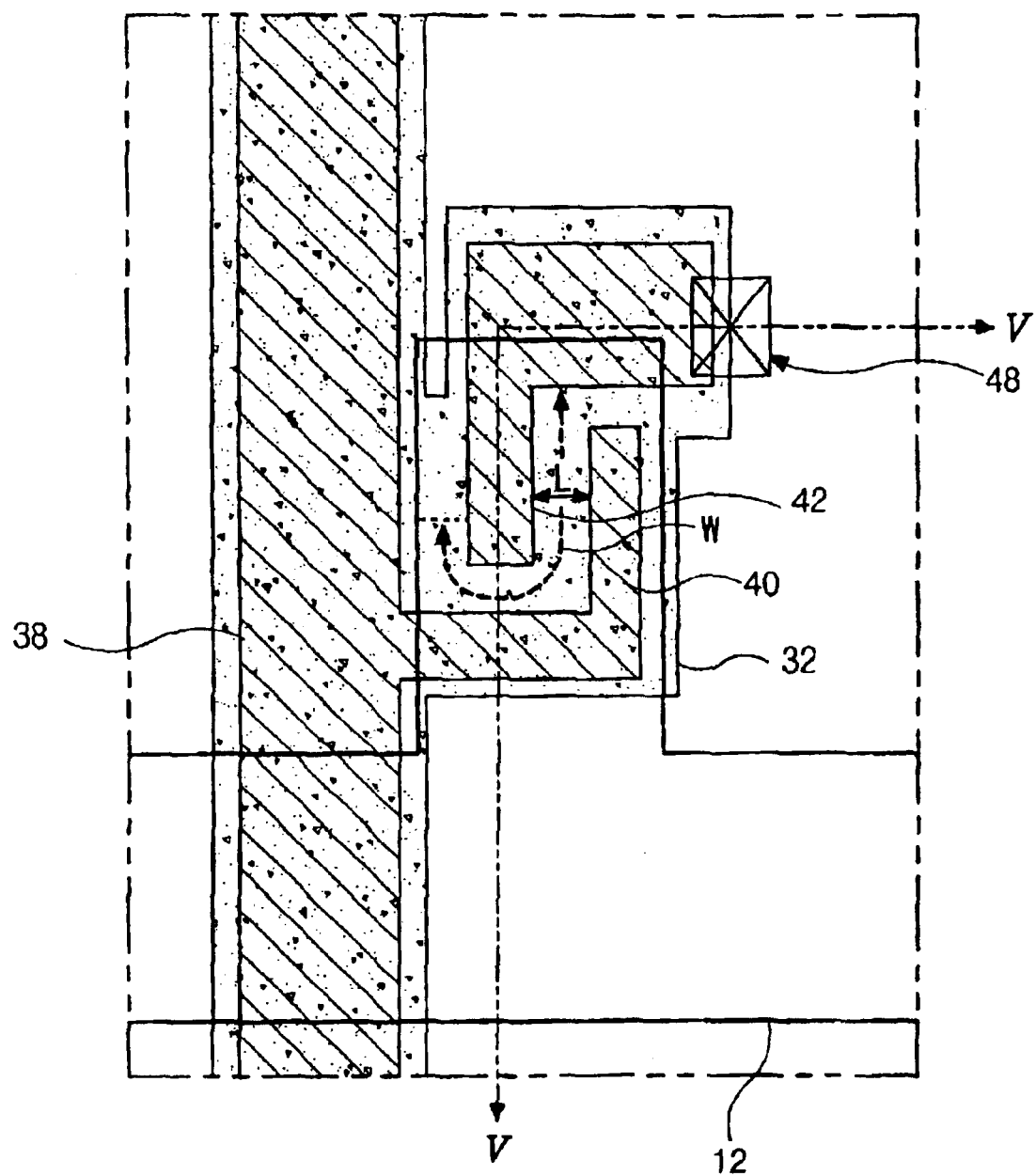
FIGS. 5A and 5B show a manufacturing method of an array substrate using four masks according to the related art.
Figure 5B:
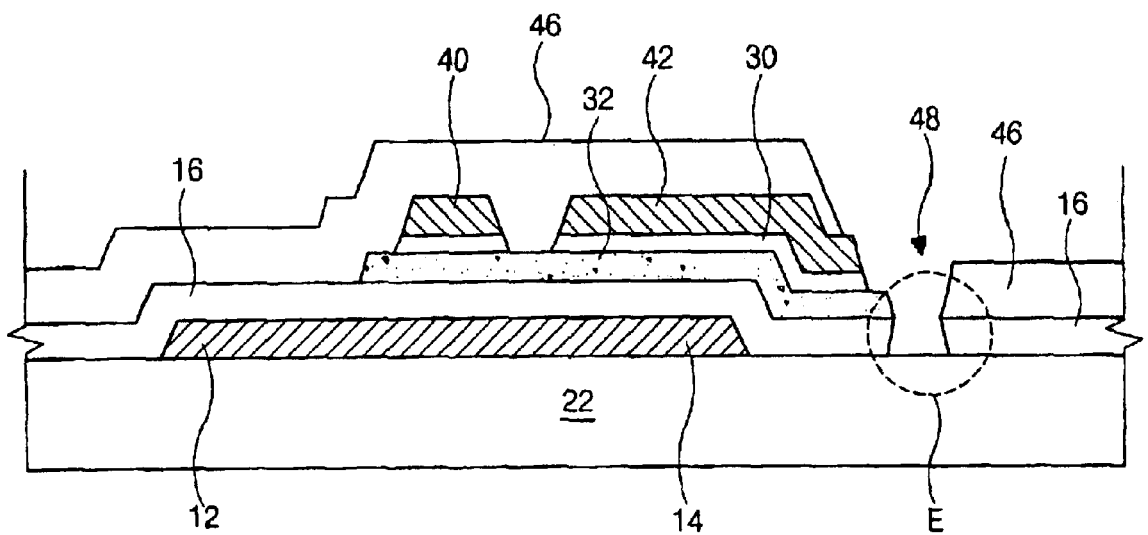
Figure 6A:
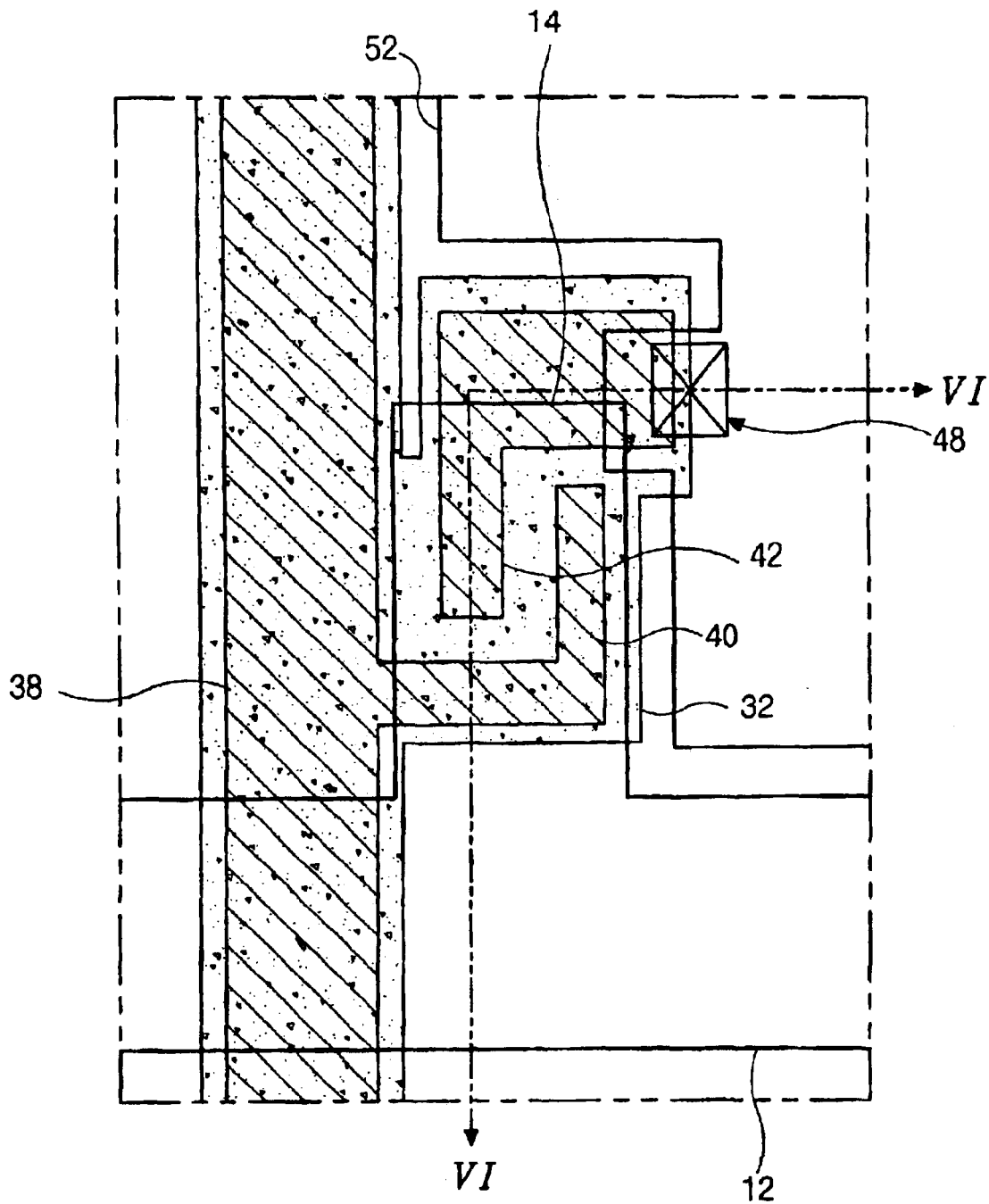
FIGS. 6A and 6B show a manufacturing method of an array substrate using four masks according to the related art.
Figure 6B:
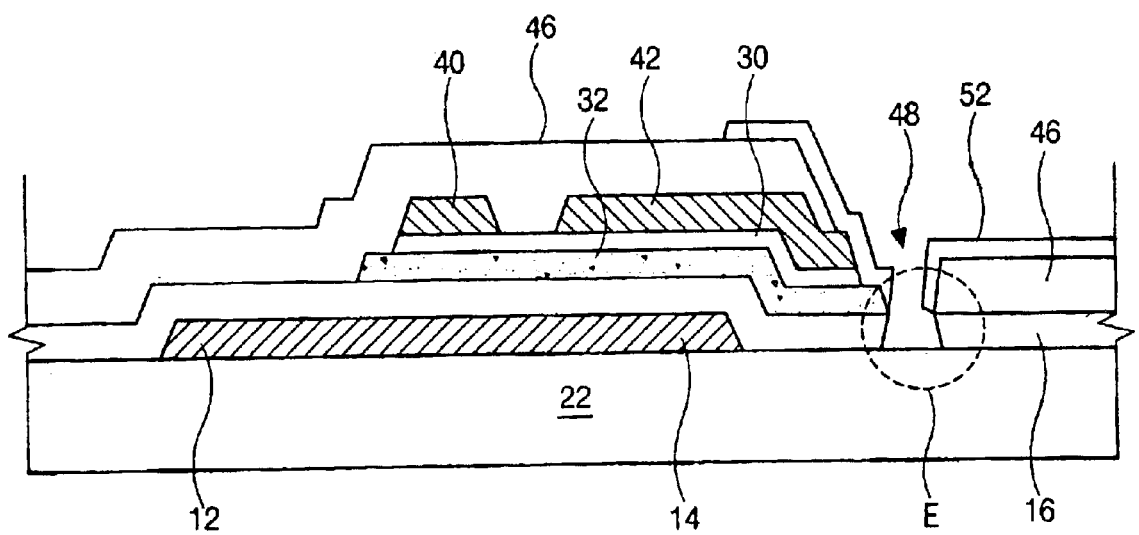
Figure 7:
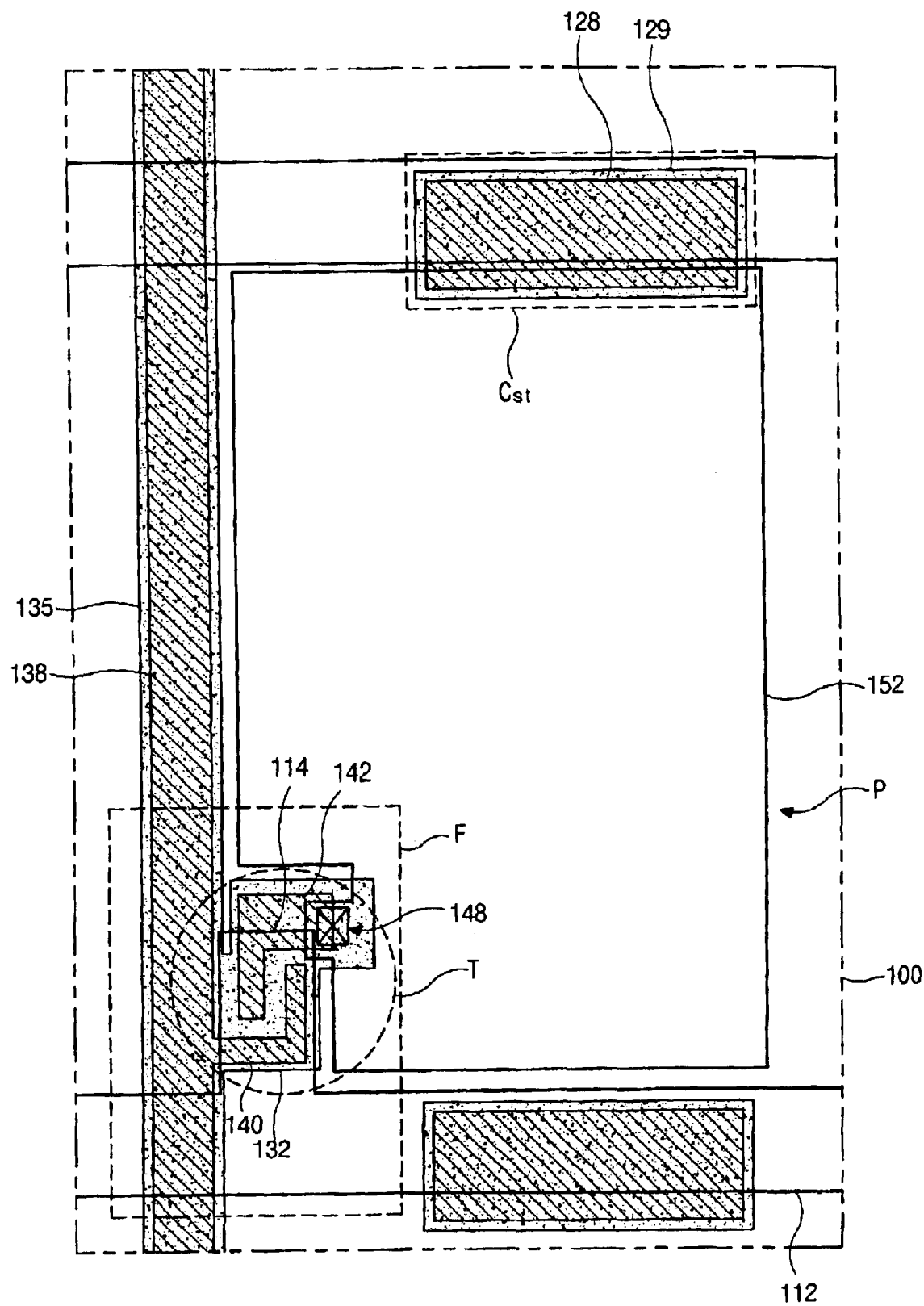
FIG. 7 is a plan view of an exemplary array substrate for a liquid crystal display (LCD) device according to the present invention.

FIG. 7 is a plan view of an exemplary array substrate for a liquid crystal display (LCD) device according to the present invention. In FIG. 7, a gate line 112 and a data line 138 may be formed to cross each other to define a pixel area P. A thin film transistor T may be formed at the crossing of the gate and data lines 112 and 138 to function as a switching element. The thin film transistor T may include a gate electrode 114 that may be connected to the gate line 112 and may receive scanning signals, a source electrode 140 that may be connected to the data line 138 and may receive data signals, and a drain electrode 142 that may be spaced apart from the source electrode 140. The source electrode 140 may have a "U" shape and may surround the drain electrode 142. The thin film transistor T may further include an active layer 132 between the gate electrode 114 and the source and drain electrodes 140 and 142.

A storage capacitor electrode 128 may be formed to overlap the gate line 112. The storage capacitor electrode 128 may be made of the same material as the data line 138, and a pixel electrode 152 may be formed in the pixel area P. The pixel electrode 152 may be connected to the drain electrode 142 through a drain contact hole 148, and may be connected to the storage capacitor electrode 128 via a side contact, for example. The gate line 112 and the storage capacitor electrode 128 may function as first and second storage capacitor electrodes, respectively, thereby forming a storage capacitor Cst.

Although not shown in FIG. 7, an ohmic contact layer may be formed between the active layer 132 and the source and drain electrodes 140 and 142. The active layer 132 may include amorphous silicon, and the ohmic contact layer may be formed of a doped amorphous silicon. A first pattern 135 and a second pattern 129, which may include the amorphous silicon and the doped amorphous silicon, may be formed under the data line 138 and the storage capacitor electrode 128, respectively.

The active layer 132 may have a shape similar to the source and drain electrodes 140 and 142 except for a first portion between the source and drain electrodes 140 and 142 and a second portion corresponding to the drain contact hole 148. In addition, the drain contact hole 148 formed in a passivation layer (not shown) may be situated on the active layer 132, and a gate insulating layer (not shown) corresponding to the drain contact hole 148 may not be etched. Thus, electrical disconnection of the pixel electrode 152 may be prevented.

Figure 8A:
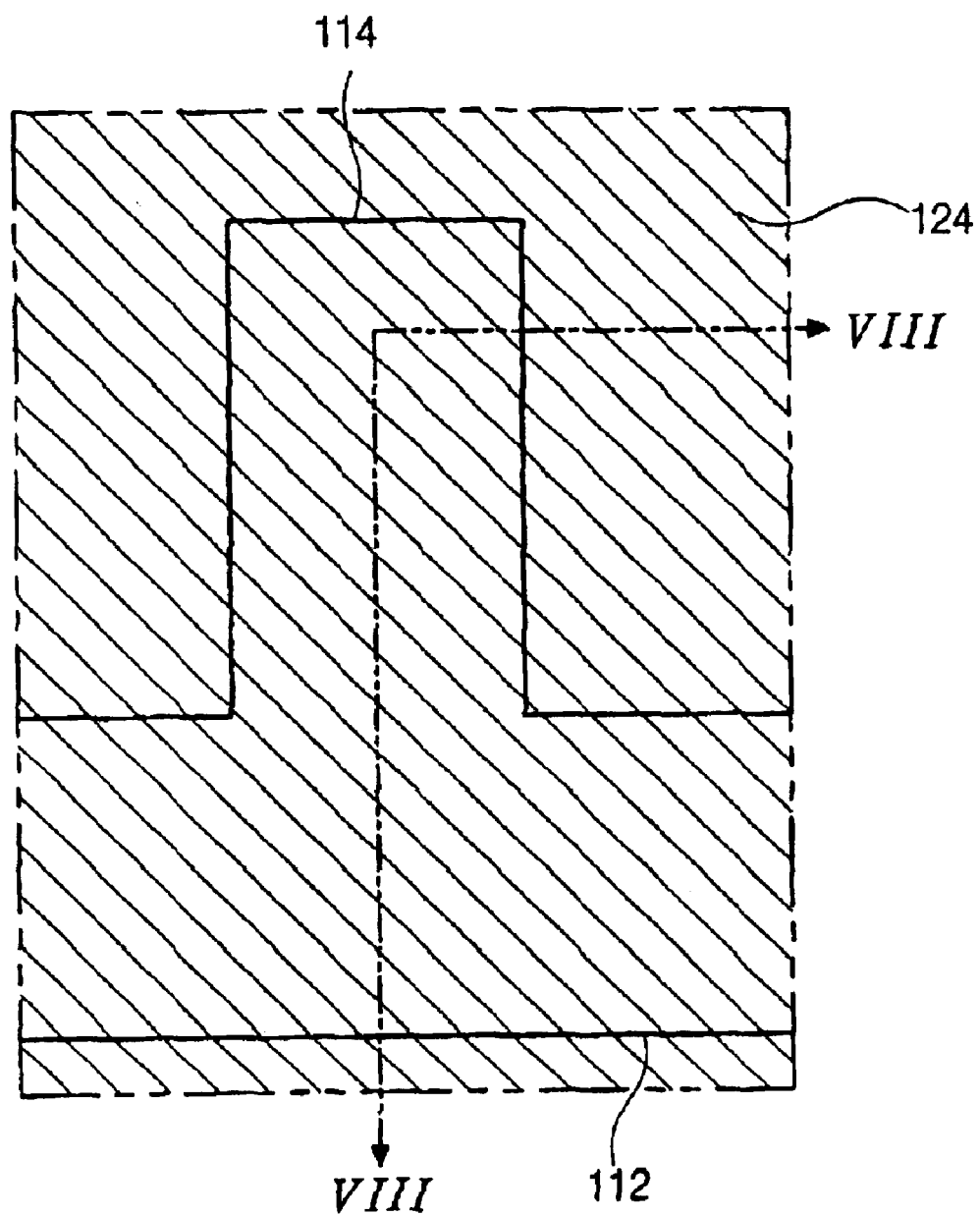
FIGS. 8A to 8C show an exemplary manufacturing method of an array substrate according to the present invention.
Figure 8B:
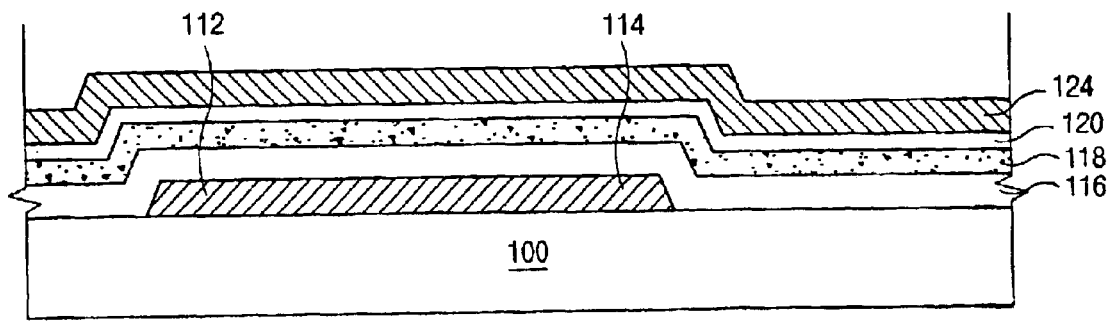
Figure 8C:
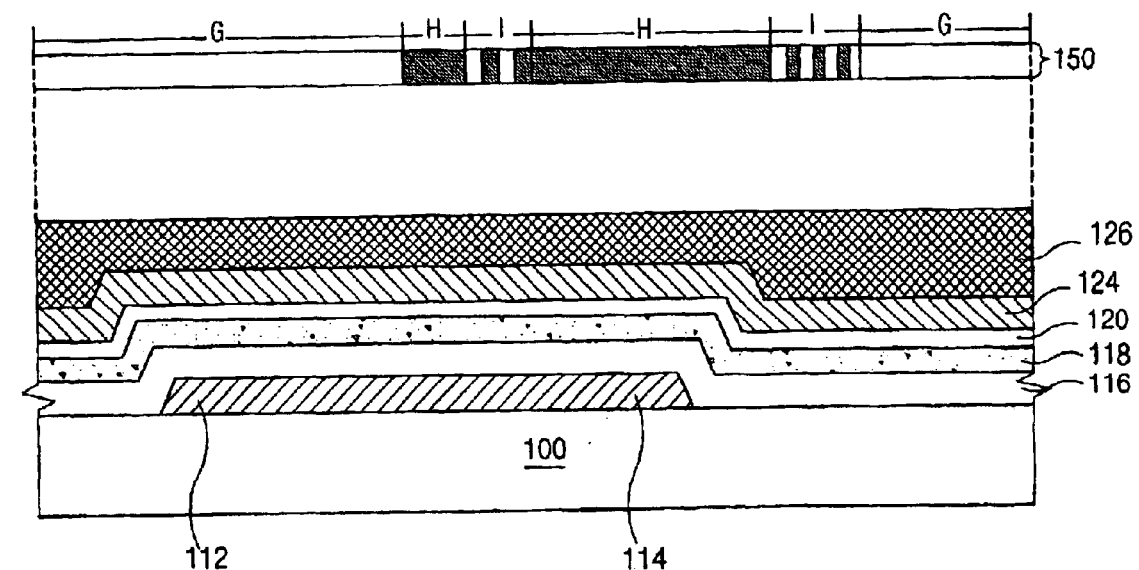
Figure 9A:
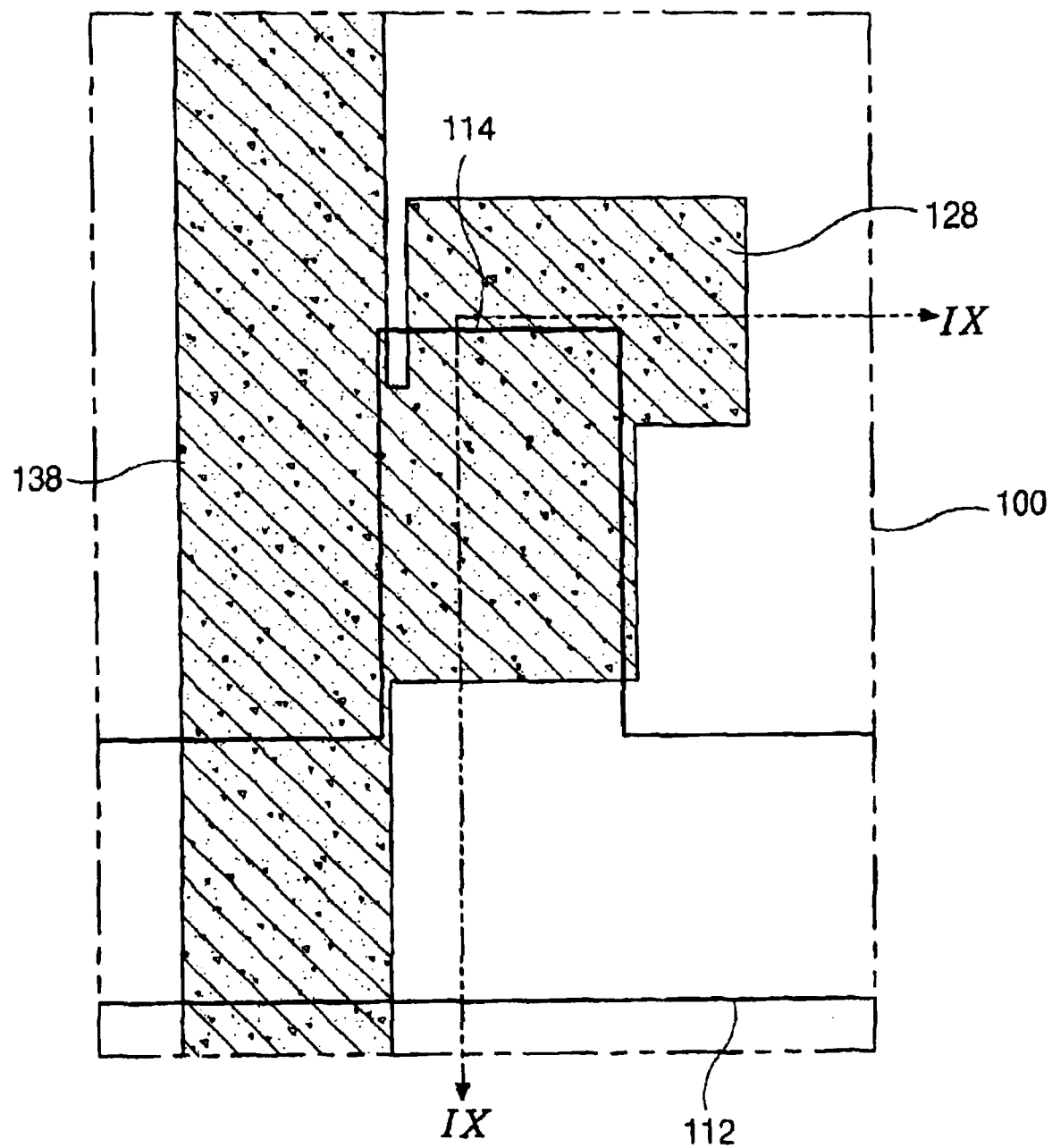
FIGS. 9A to 9C show an exemplary manufacturing method of an array substrate according to the present invention.
Figure 9B:
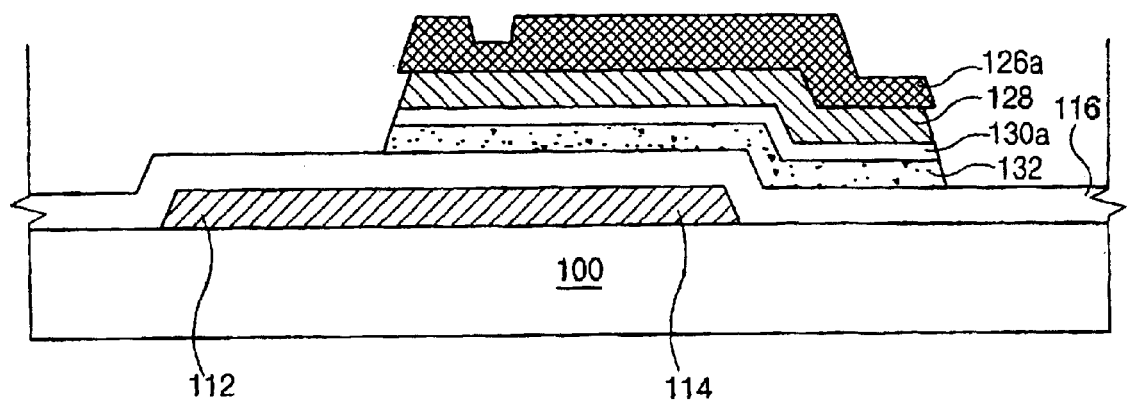
Figure 9C:
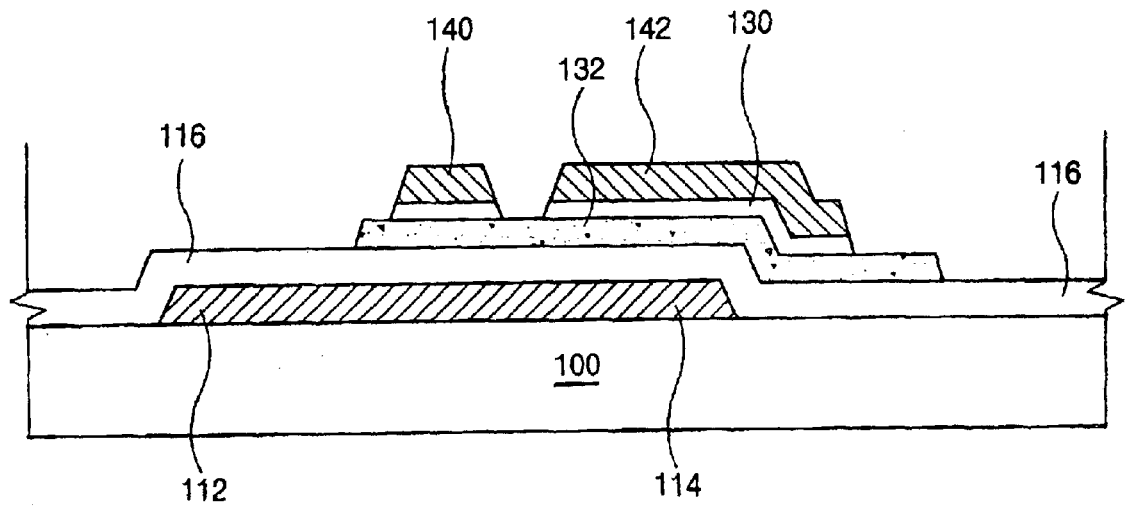
Figure 10A:
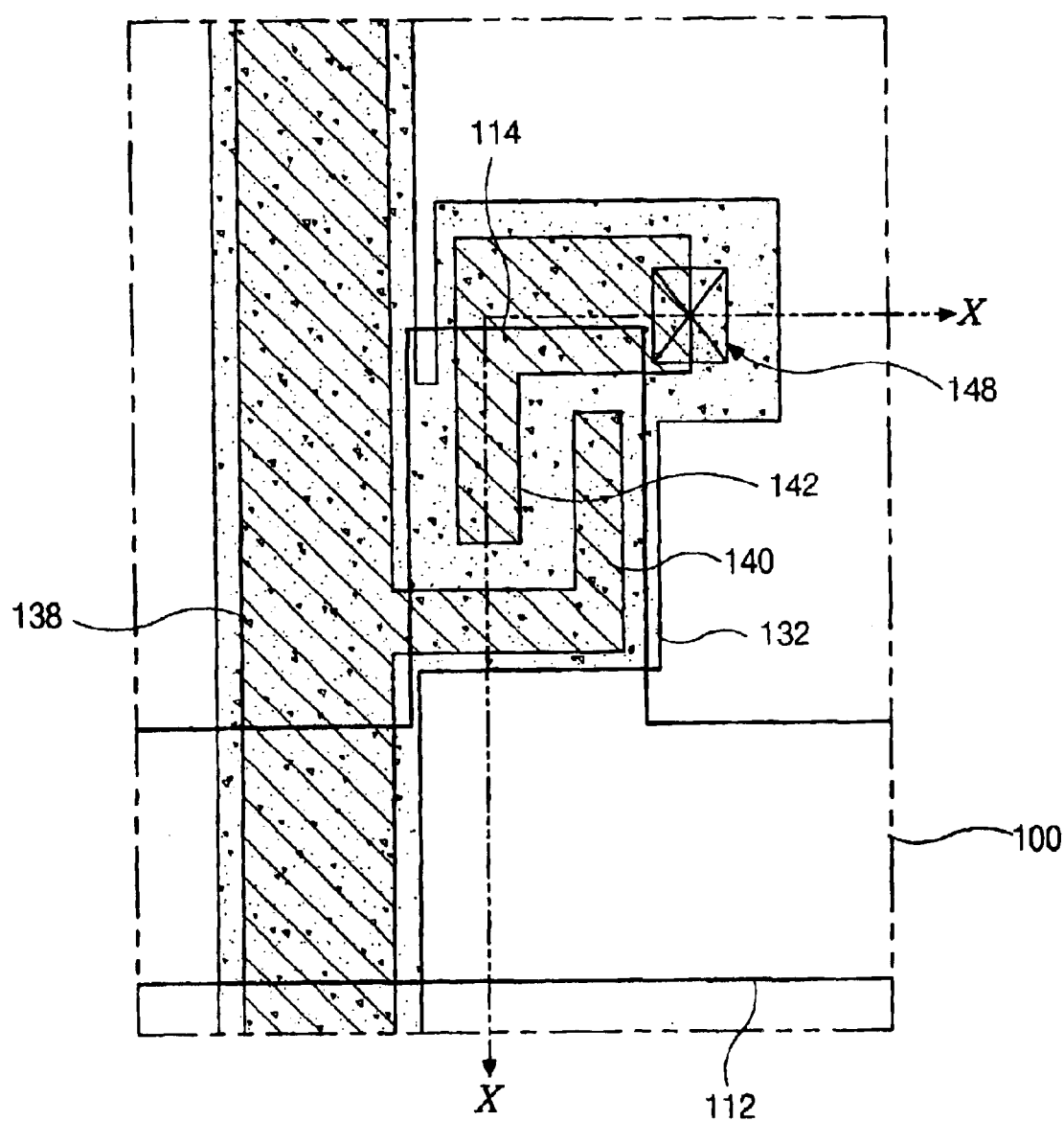
FIGS. 10A and 10B show an exemplary manufacturing method of an array substrate according to the present invention.
Figure 10B:
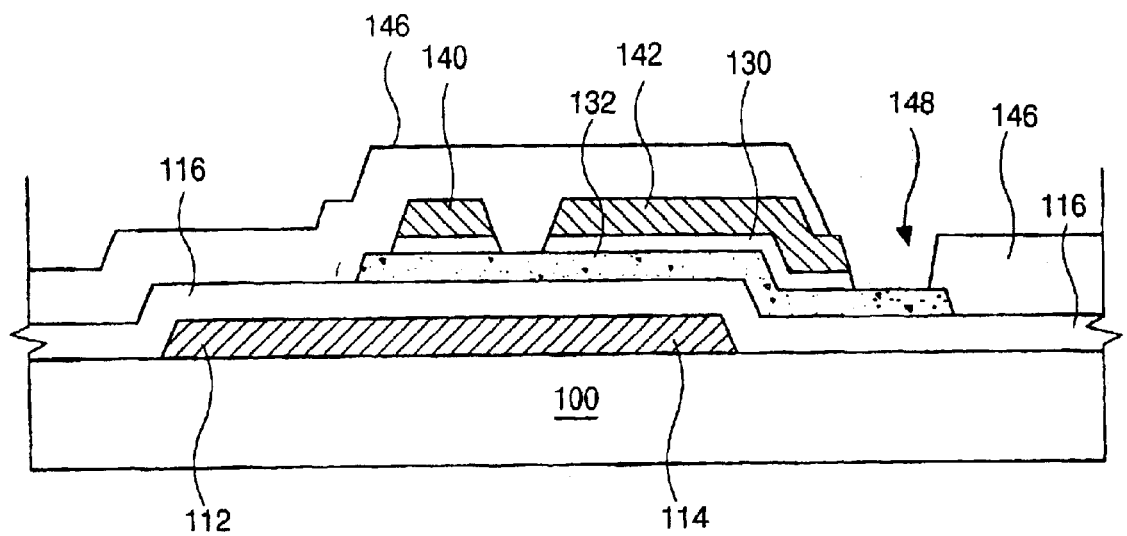
Figure 11A:
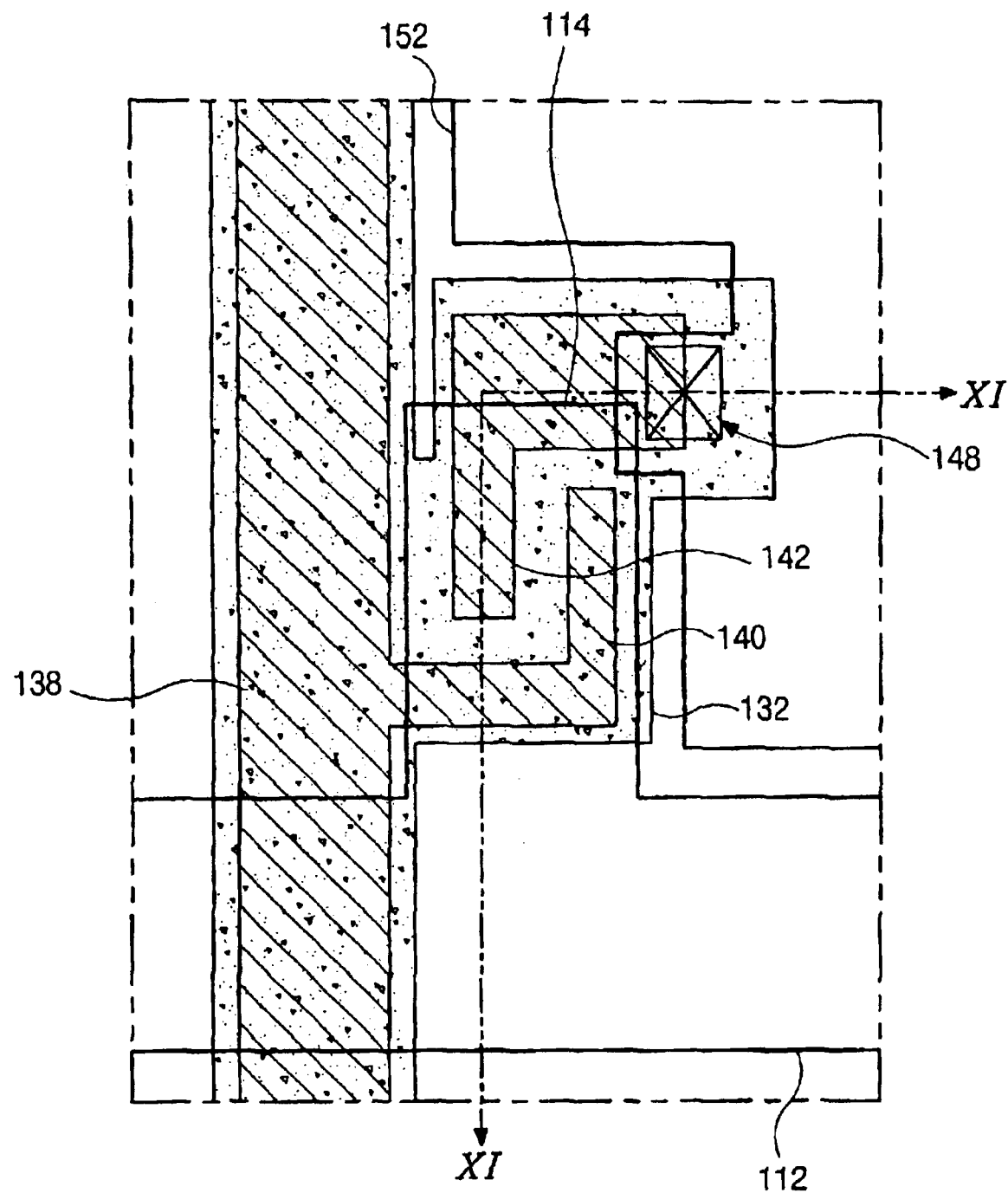
FIGS. 11A and 11B show an exemplary manufacturing method of an array substrate according to the present invention.
Figure 11B:
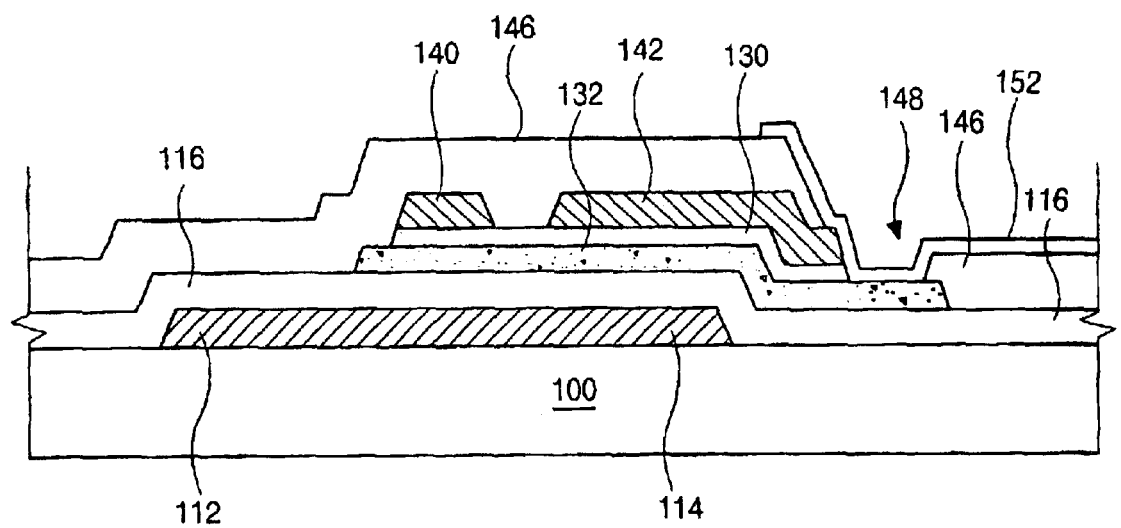

FIGS. 8A to 8C, 9A to 9C, 10A, 10B, 11A, and 11B show an exemplary manufacturing method of the array substrate using four masks according to the present invention, and correspond to a region F of FIG. 7. FIGS. 8A, 9A, 10A, and 11A are plan views showing the exemplary manufacturing method of an array substrate according to the present invention, and FIGS. 8B and 8C are cross sectional views along VIII—VIII of FIG. 8A, FIGS. 9B and 9C are cross sectional view along IX—IX of FIG. 9A, FIG. 10B is a cross sectional view along X—X of FIG. 10A, and FIG. 11B is a cross-sectional view along XI—XI of FIG. 11A.

In FIGS. 8A and 8B, a gate line 112 and a gate electrode 114 may be formed on a transparent insulating substrate 100 by depositing a first metal layer and patterning the first metal layer through a first mask process. The gate line 112 and the gate electrode 114 may include a metal material, such as aluminum (Al), an aluminum alloy, molybdenum (Mo), tungsten (W), and chromium (Cr). The gate line 112 and the gate electrode 114 may be formed of a double layer using aluminum or an aluminum alloy and molybdenum or chromium.

Next, a gate insulating layer 116, an amorphous silicon layer 118, a doped amorphous silicon layer 120, and a second metal layer 124 may be subsequently deposited on the substrate 100 including the gate line 112 and the gate electrode 114. The gate insulating layer 116 may include an inorganic insulating material, such as silicon nitride ($SiN_x$) and silicon oxide ($SiO_2$), and the second metal layer 124 may include one of chromium, molybdenum, tungsten, and tantalum (Ta).

In FIG. 8C, a photoresist layer 126 may be formed on the second metal layer 124 by coating photoresist. A mask 150 having a transmitting portion G, a blocking portion H, and a half transmitting portion I may be disposed over the photoresist layer 126. The half transmitting portion I may correspond to a channel of a thin film transistor and to a later-formed drain contact hole. The photoresist layer 126 may be a positive type, wherein a portion exposed to light is developed and removed. Subsequently, the photoresist layer 126 may be exposed to light, and the photoresist layer 126 corresponding to the half transmitting portion I may be exposed to the light by an amount less than the photoresist layer 126 corresponding to the transmitting portion G.

In FIGS. 9A and 9B, the photoresist layer 126 (in FIG. 8C) may be developed, wherein a photoresist pattern 126a having different thicknesses may be formed. A first thickness of the photoresist pattern 126a may correspond to the blocking portion H (in FIG. 8C), and a second thickness of the photoresist pattern 126a, which is thinner than the first thickness, may correspond to the half transmitting portion I (in FIG. 8C). The second metal layer 124, the doped amorphous silicon layer 120, and the amorphous silicon layer 118 (in FIG. 8C) that has been exposed by the photoresist pattern 126a may be removed. Thus, a source and drain pattern 128, a data line 138, a doped amorphous silicon pattern 130a, and an active layer 132 may be formed. The second metal layer 124 (in FIG. 8C) may be etched by a dry etching method, and the doped amorphous silicon layer 120 (in FIG. 8C) and the amorphous silicon layer 118 (in FIG. 8C) may be patterned by a wet etching method. The source and drain pattern 128 may be formed over the gate electrode 114, and may be connected to a data line 38 that extends along a vertical direction. The doped amorphous silicon pattern 130a and the active layer 132 may have the same shape as the source and drain pattern 128 and the data line 138.

The photoresist pattern 126a of the first thickness may be removed through an ashing process, thereby exposing portions of the source and drain pattern 128. At this time, the photoresist pattern 126a of the second thickness may also be partially removed partially and the thickness of the photoresist pattern 126a may be reduced. In addition, edges of the photoresist pattern 126a may be removed.

In FIG. 9C, the source and drain pattern 128 (in FIG. 9B) and the doped amorphous silicon pattern 130a (in FIG. 9B) that have been exposed by the photoresist pattern 126a may be etched, thereby forming source and drain electrodes 140 and 142 and an ohmic contact layer 130. The active layer 132 exposed by the source and drain electrodes 140 and 142 may correspond to the half transmitting portion I (in FIG. 8C). Although not shown in FIG. 9C, the source electrode 140 may have a "U" shape and may surround the drain electrode 142. Accordingly, since a channel length between the source and drain electrodes 140 and 142 is reduced and a channel width increases due to the "U" shape, carrier mobility of the thin film transistor increases. In addition, the source and drain electrodes 140 and 142, the data line 138, the ohmic contact layer 130, and the active layer 132 may be formed through a second mask process using the mask 150 (in FIG. 8C).

In FIGS. 10A and 10B, a passivation layer 146 may be formed on the data line 138 and the source and drain electrodes 140 and 142 by coating a transparent organic material, such as benzocyclobutene (BCB) and an acrylic resin, or by depositing an inorganic material, such as silicon nitride (SiNx) and silicon oxide (SiO$_2$). Next, the passivation layer 146 may be patterned through a third mask process, thereby forming a drain contact hole 148 that exposes a portion of the drain electrode 142. The drain contact hole 148 may be situated on the active layer, and may expose not only a sidewall of the drain electrode 142 but also the active layer 132. Thus, the gate insulating layer 116 corresponding to the drain contact hole 148 may not be etched.

In FIGS. 11A and 11B, a pixel electrode 152 may be formed on the passivation layer 146 by depositing a transparent conductive material, such as indium-tin-oxide (ITO) and indium-zinc-oxide (IZO), and patterning the transparent conductive material through a fourth mask process. The pixel electrode 152 may be connected to the drain electrode 142 via the drain contact hole 148. Accordingly, the array substrate of the present invention may be manufactured by using four masks.

In the present invention, since the drain contact hole 148 may be formed on the active layer 132, the gate insulating layer 116 may not be exposed during the third mask process. Accordingly, since a step may not be formed in the gate insulating layer 116, disconnection of the pixel electrode 152 may be prevented. Thus, productivity of the liquid crystal display device increases.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
    a substrate;
    a gate line and a data line on the substrate, the gate line and the data line crossing each other to define a pixel area;
    a thin film transistor electrically connected to the gate and data line and includes a gate electrode, an active layer, a source electrode, and a drain electrode;
    a passivation layer covering the gate line, the data line, and the thin film transistor, and having a contact hole situated on the active layer to expose portions of the drain electrode and the active layer; and
    a pixel electrode on the passivation layer and connected to the drain electrode through the contact hole.

2. The array substrate according to claim 1, wherein the active layer has the same shape as the data line, the source electrode, and the drain electrode except for a first portion between the source and drain electrodes and a second portion corresponding to the contact hole.

3. The array substrate according to claim 1, wherein the source electrode has a "U" shape and surrounds the drain electrode.

4. The array substrate according to claim 1, wherein the contact hole exposes a sidewall of the drain electrode.

5. The array substrate according to claim 1, wherein the active layer includes amorphous silicon.

6. The array substrate according to claim 1, further comprising an ohmic contact layer between the active layer and the source and drain electrodes.

7. The array substrate according to claim 6, wherein the ohmic contact layer has the same shape as the data line, the source electrode, and the drain electrode.

8. The array substrate according to claim 6, wherein the ohmic contact layer includes doped amorphous silicon layer.

* * * * *